United States Patent [19]

Soeda et al.

[11] 4,356,214
[45] Oct. 26, 1982

[54] METHOD OF FORMING PUNCTURE PREVENTING LAYER FOR TIRE AND APPARATUS EMPLOYED THEREFOR

[75] Inventors: Kozi Soeda, Nishinomiya; Katuyuki Hoshikawa, Nyogo; Akitaka Kimura, Kobe, all of Japan

[73] Assignee: Sumitomo Rubber Industries, Ltd., Japan

[21] Appl. No.: 221,775

[22] Filed: Dec. 31, 1980

Related U.S. Application Data

[60] Continuation of Ser. No. 81,458, Oct. 3, 1979, Pat. No. 4,262,624, which is a division of Ser. No. 865,133, Dec. 28, 1977, abandoned.

[30] Foreign Application Priority Data

Dec. 30, 1976 [JP] Japan .............................. 51/158497

[51] Int. Cl.$^3$ .............................................. B05D 1/02
[52] U.S. Cl. ..................................... 427/233; 427/231; 427/236; 427/240; 427/421; 427/425; 156/115; 152/346; 152/347
[58] Field of Search ..................... 118/44, 55, 56, 318, 118/319, 321, 322; 239/214, 215, 223, 224; 156/115; 152/346, 347, 348; 427/231, 233, 236, 240, 421, 425

[56] References Cited

U.S. PATENT DOCUMENTS

| | | | |
|---|---|---|---|
| 1,289,779 | 12/1918 | Howard | 239/215 |
| 3,034,729 | 5/1962 | Gray et al. | 239/215 |
| 3,428,044 | 2/1969 | Whitehead et al. | 427/424 |
| 3,769,122 | 10/1973 | Coddington | 156/115 |
| 4,064,922 | 12/1977 | Farber et al. | 152/347 |
| 4,090,546 | 5/1978 | Honda | 156/115 |

*Primary Examiner*—Shrive P. Beck
*Attorney, Agent, or Firm*—Stevens, Davis, Miller & Mosher

[57] ABSTRACT

A method of forming a puncture preventing layer on an innner surface of a pneumatic tire including the steps of extruding sealing material and pulverizing the extruded sealing material into fine particles for coating the inner surface with a layer of the sealing material under pressure through action of centrifugal force. For effecting the above described method in an efficient manner, there is also provided a puncture preventing layer forming apparatus which includes arrangements for holding the tire, extruding the sealing material, and pulverizing the extruded sealing material so as to be coated onto the inner surface of the tire through the action of centrifugal force.

8 Claims, 2 Drawing Figures

METHOD OF FORMING PUNCTURE PREVENTING LAYER FOR TIRE AND APPARATUS EMPLOYED THEREFOR

This is a continuation of application Ser. No. 81,458, filed Oct. 3, 1979, now U.S. Pat. No. 4,262,624 granted on Apr. 21, 1981, which in turn is a division of Ser. No. 865,133, filed Dec. 28, 1977, now abandoned.

BACKGROUND OF THE INVENTION

The present invention relates to pneumatic tires and more particularly, to a method of forming puncture preventing layer on an inner surface of a pneumatic tire and an apparatus employed therefor.

For forming a puncture preventing layer on an inner surface of a pneumatic tire, there has been known a method in which such a layer is formed by a sealing material during molding or after molding of a green or unfinished tire, in which case, however, the green tire is further subjected to vulcanization process, and since such sealing material, if comparatively small in viscosity, tends to become uneven in quality during the vulcanization, it is very difficult to obtain the puncture prevention layer of a predetermined quality. Therefore, depending on the kinds of the sealing materials, such puncture prevention layer should preferably be formed after vulcanization of the green tire. In this case, there may be employed one method in which a sealing material extruded into a sheet-like form is applied onto the inner surface of the tire, and another method in which the sealing material is sprayed onto the inner surface of the tire to form thereon the puncture prevention layer. Although the latter spraying method is preferable due to its simplicity, there are such disadvantages that, in the known high pressure (high temperature) spraying, the sealing material must be in a state close to liquid, and if powder rubber or the like is contained in the sealing material, clogging may result during the spraying, thus the sealing material which can be employed being undesirably limited.

Accordingly, an essential object of the present invention is to provide an improved method of forming puncture preventing layer for a pneumatic tire in which a sealing material extruded even of high viscosity is pulverized into fine particles for being coated under pressure onto an inner surface of a pneumatic tire through centrifugal force, without possibility of clogging during spraying.

Another important object of the present invention is to provide an apparatus which is employable for effecting the puncture preventing layer forming method as described above in an efficient manner.

A further object of the present invention is to provide an apparatus of the above described type which is simple in construction and accurate in functioning, and can be manufactured at low cost.

SUMMARY OF THE INVENTION

In accomplishing these and other objects, according to the present invention, the method of forming a puncture preventing layer on an inner surface of a pneumatic tire includes the steps of extruding sealing material, and pulverizing the extruded sealing material into fine particles for coating the inner surface of the tire with such sealing material under pressure through action of centrifugal force to form the puncture preventing layer on the inner surface of the tire.

For effecting the above described method in an efficient manner, there is also provided a puncture preventing layer forming apparatus which includes means for holding the tire, means for extruding sealing material, and means for pulverizing the extruded sealing material so as to be coated under pressure onto the inner surface of the tire through action of centrifugal force.

By the above arrangement, it has been made possible to pulverize even a sealing material of high viscosity for efficient spraying of such sealing material onto the inner surface of the tire to form the puncture preventing layer thereon without possibility of clogging during spraying even when powder rubber or the like happens to be contained in the sealing material, with substantial elimination of disadvantages inherent in the conventional puncture preventing layer forming methods and apparatuses.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout the drawings.

DETAILED DESCRIPTION OF THE INVENTION

Figure 1:
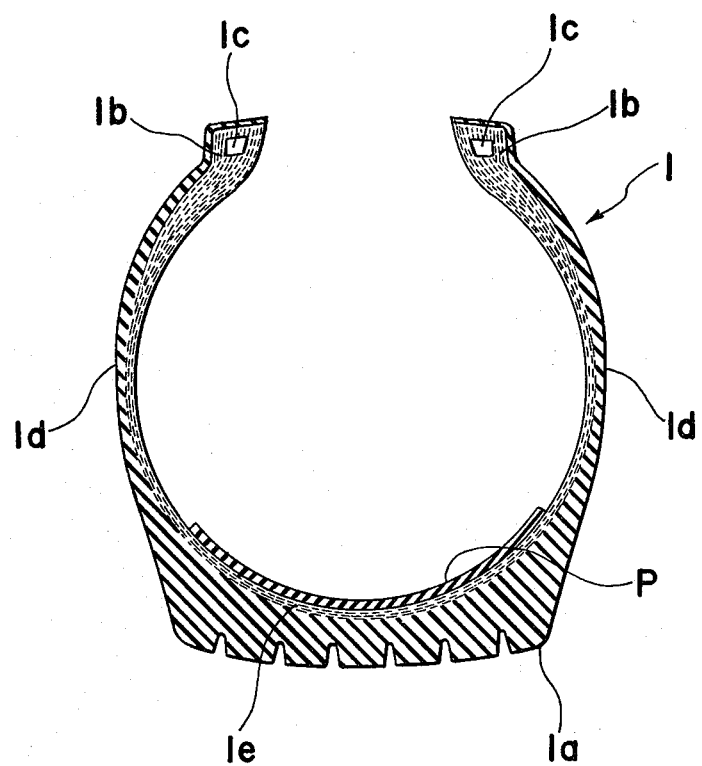
FIG. 1 is a sectional view of a pneumatic tire, with an innter tube removed away, in which a puncture preventing layer is formed according to the puncture preventing layer forming method and apparatus therefor of the present invention.

Referring to FIG. 1, the pneumatic tire or tire cover 1 to which the present invention may be applied includes a tread portion 1a, a pair of opposed side wall portions 1d contiguous to both sides of the tread portion 1a, a pair of bead portions 1b in which bead cores 1c are respectively embedded, and a carcass portion 1e, for example, of a bias-ply defining the inner surface of the tire 1 in a known manner. The tire 1 further includes a puncture preventing layer P formed according to the method and apparatus of the present invention on the inner surface 1e in a position generally corresponding to the tread portion 1a as shown.

Figure 2:
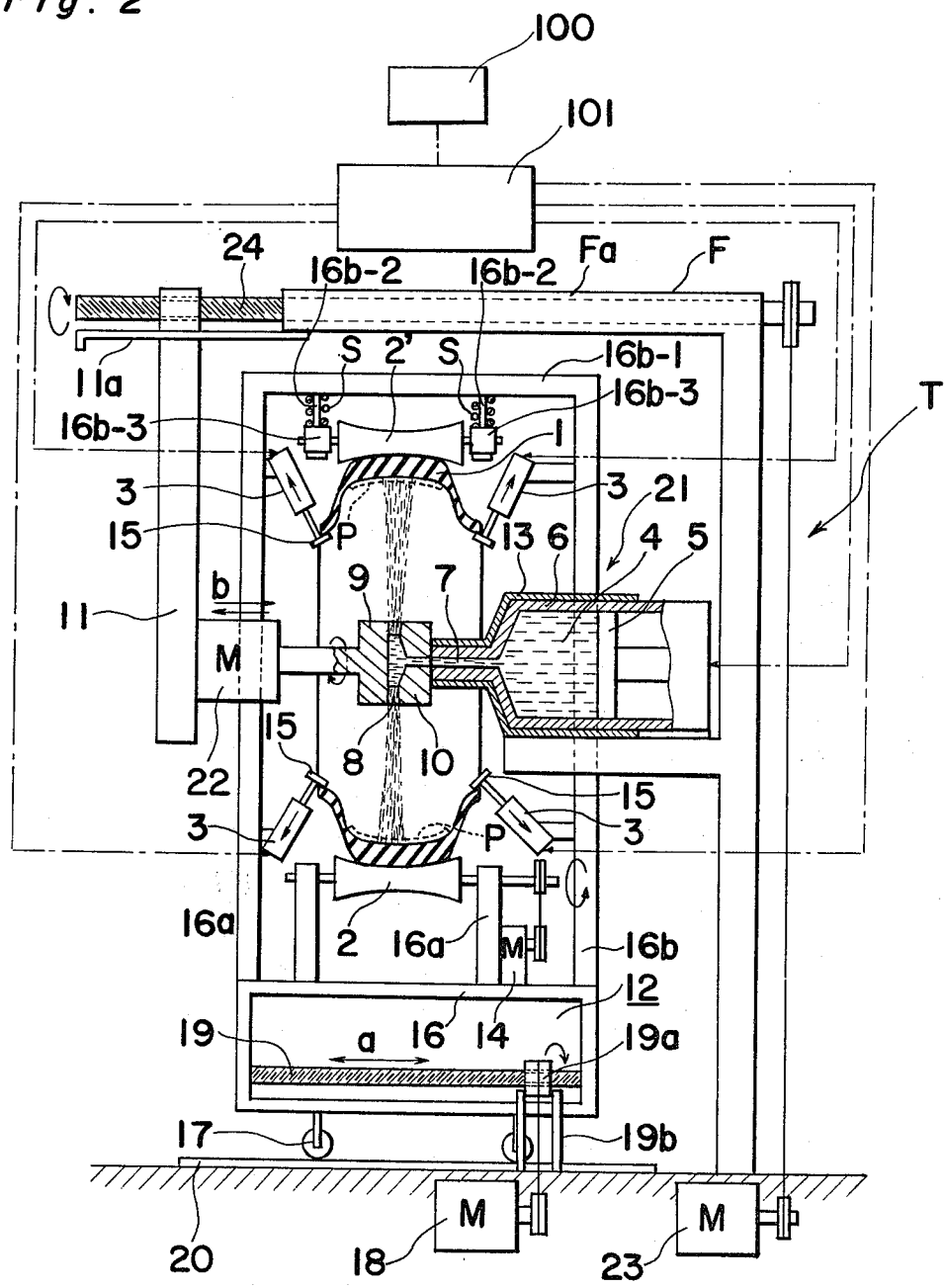
FIG. 2 is a schematic side elevational view, partly in section, showing construction of the puncture preventing layer forming apparatus of the present invention.

Referring also to FIG. 2, there is shown an apparatus T of the present invention for forming the puncture preventing layer P of FIG. 1 which generally comprises means for holding the tire 1, means for extruding sealing material 4 and means for pulverizing the extruded sealing material for application thereof onto the inner surface 1e of the tire 1 under pressure to form the puncture preventing layer P on said inner surface 1e. More specifically, the apparatus T includes a base portion 16 of rectangular box-like configuration for a shifting device 12 which is movably disposed at a lower portion of the apparatus T and on which a pair of spaced columns 16a extend upwardly from the upper surface of the base portion 16 for rotatably supporting therebetween a driving roller 2 having a concave face and associated, through a suitable transmission means, for example, a chain and sprocket mechanism and the like, with a first motor 14 placed on the base portion 16, and an upper frame 16b of generally rectangular shape which also extends upwardly from the surface of the base portion 16 over the spaced columns 16a. From the top horizontal portion 16b-1 of the rectangular frame 16b, two spaced supports 16b-2 corresponding in positions to the support columns 16 extend downwardly to support therebetween a guide roller 2' having a corresponding concave face through sliding members 16b-3 slidably fitted over the lower end of the supports 16b-2 to be retained thereat and normally urged downward, for example, by spring means 8 disposed around the supports 16b-2, so that when a pneumatic tire 1 is disposed between the rollers 2 and 2', such a tire is depressed toward the driving roller 2 by the guide roller 2' and held between the rollers 2 and 2' in a known manner. In positions adjacent to the bead portions 1b (FIG. 1) of the tire 1, there are disposed cylinders 3 each having a rotary expanding wheel 15 at its forward end for expanding the bead portions 1b of the tire 1 outwardly and secured to corresponding brackets extending inwardly from the upper frame 16 as shown.

It should be noted here that each of the cylinders 3 is coupled to a source 100 of working medium or power fluid through a suitable control device 101 as shown by chain lines in FIG. 2.

The base portion 16 of the shifting device 12 further includes a plurality of wheels 17 provided for displacement of the base portion 16 on the lower surface thereof, which wheels 17 are rotatable on a guide rail 20 disposed on the ground level, and a screw bar 19 horizontally extending in said base portion 16 and threadedly engaged with a corresponding threaded member 19a which is rotatably supported on a support or stopper 19b secured to the guide rail 20 to be associated with a second motor 18, for example, through a chain and sprocket mechanism.

Accordingly, upon rotation of the second motor 18, the base portion 16 is movable together with the drive roller 2, guide roller 2', and cylinders 3 supported on the spaced columns 16a and rectangular frame 16b in directions indicated by the arrow a, i.e., in the axial direction of the tire 1 held between the rollers 2 and 2'.

The apparatus T further comprises a sealing material spraying device 21 fixedly disposed, for example, at the right of the axis of the tire 1 on an L-shaped frame F extending upwardly from the ground. The sealing material supplying device 21 includes a cylinder 6 enclosed in a heating device 13 and a piston 5 housed in the cylinder 6 and coupled with the working medium source 100 through the control device 101 for reciprocation within the cylinder 6 so as to extrude the sealing material 4 contained in the cylinder 6 through a bore 7 of small diameter which is formed in the forward portion of said cylinder 6 and open at a fixed disc 10 provided on the distal end of the cylinder 6.

In a corresponding position facing the fixed disc 10 at the left side of the axis of the tire 1, there is provided a rotary disc 9 in a coaxial relation to the fixed disc 10, with the rotary disc 9 being coupled, for high speed rotation thereof in a direction shown by an arrow, with a shaft of a third motor 22 which is secured adjacent to one end of a support shaft 11. The other end of the supported shaft 11 is threaded for engagement with one end of a screw bar 24 rotatably mounted on an upper horizontal arm Fa of the frame F, while the other end of the screw bar 24 is associated for rotation with a fourth motor 23, for example, by a chain and sprocket mechanism and the like. Since the support shaft 11 is prevented from rotation by a guide member or stopper 11a secured, at its one end, to a corresponding end of the horizontal arm Fa of the frame F, said support shaft 11 together with the motor 22, and rotary disc 9 can be selectively moved in the directions indicated by arrows b upon rotation of the screw bar 24 in the direction shown by the motor 23, by which arrangement, it is possible to set the tire 1 between the rollers 2 and 2' or remove the same tire 1 held between the said rollers 2 and 2', while simultaneously, the rotary disc 9 can be held in position with respect to the fixed disc 10, with a small clearance 8 provided therebetween for spraying the sealing material 4 therethrough onto the inner surface 1e of the tire 1.

With the employment of the apparatus T as described in the foregoing, the method of forming the puncture preventing layer P in the inner surface 1e of the tire 1 will be described step by step hereinbelow.

(1) After the rotary disc 9 has been retracted to the left in FIG. 2, the tire 1 is mounted on the driving roller 2 for being held in position between the guide roller 2' and driving roller 2.

(2) The bead portions 1b of the tire 1 are expanded toward the left and right sides of the tire axis up to predetermined positions by the cylinders 3 having the expanding wheels 15.

(3) The rotary disc 9 is brought toward the fixed disc 10 up to such a position that there is provided the predetermined clearance 8 therebetween.

(4) The tire 1 held between the rollers 2 and 2' is rotated at a low speed by driving the driving roller 2.

(5) By operating the piston 5, the sealing material 4 accommodated in the cylinder 6 is extruded through the bore 7 and the clearance 8.

(6) Simultaneously with or before or after the procedure in the above item 5, the rotary disc 9 is rotated at a high speed for spraying the sealing material 4 through centrifugal force.

(7) Meanwhile, the tire 1 held between the rollers 2 and 2' is moved at a low speed from the left to the right or from the right to the left in FIG. 2 along the axis of the tire 1 so that the sealing material 4 is sprayed only onto the predetermined portion of the inner surface 1e of the tire 1.

(6) Upon completion of the spraying, the rotary disc 9 is spaced away from the fixed disc 10, and the tire 1 held between the rollers 2 and 2' is removed.

It should be noted here that the method of forming puncture preventing layer according to the present invention is not limited, in its application, to the foregoing procedures, but may be altered in its order within the scope depending on the necessity.

It should also be noted that in the apparatus T according to the present invention, the fixed disc 10 and the rotary disc 9 may be modified to be changed in their positions with each other, or to be rotated in directions opposite to each other. In any case, in the present invention, these two discs 9 and 10 form means for pulverizing the sealing material and applying the same under pressure onto the inner surface of the tire through centrifugal force.

It is further to be noted that the angle and the like of the clearance 8 formed between the two discs 9 and 10 may be suitably selected to provide the optimum condition for the spraying.

Given below is one Example carried out through the method as described in the foregoing with the employment of the apparatus T according to the present invention.

EXAMPLE

| Working conditions | |
| --- | --- |
| (i) Composition of the sealing material | |
| Polybutene | 100 |
| Polyisobutylene | 20 |
| Aerogel | 20 |
| Powder rubber | 30 |
| (ii) Temperature of sealing material | 150° C. |
| (iii) Distance of the clearance 8 | 1.5mm |
| (iv) Revolutions of the rotary disc 9 | 4,5000r.p.m. |

Results

The puncture preventing layer of the predetermined thickness could be formed.

According to the method of the present invention as described in the foregoing, it is possible to pulverize even a high viscosity sealing material (for example, having 100,000 cps at a temperature of 150° C.) which was considered impossible to be formed into spray up to the present for application onto the inner surfaces of tires under pressure through action of centrifugal force. It is another advantage of the method and apparatus according to the present invention that even a sealing material containing therein powder rubber and the like can be coated under pressure onto the inner surfaces of tires without causing inconveniences such as clogging during spraying inherent in the conventional methods and arrangements.

Although the present invention has been fully described by way of example with reference to the attached drawings, it is to be noted that various changes and modifications are apparent to those skilled in the art. Therefore, unless otherwise such changes and modifications depart from the scope of the present invention, they should be construed as included therein.

What is claimed is:

1. A process for coating the inner surface of a pneumatic tire having a radial inner open side with a puncture sealing material having a high viscosity which comprises extruding a stream of said sealing material while at said high viscosity against a flat face of a first disk disposed facing a second disk spaced upstream therefrom, rotating said first disk relative to the second disk while the space between spaced peripheral edges of the disks is disposed opposite said open side of the tire until said stream of high viscosity material is cast by the flat face as a spray through the open side of the tire and is spread over said inner surface of the tire to form a puncture sealing coating.

2. The process of claim 1 wherein the said sealing material is substantially solventless and the second disk is rotated in a direction opposite to the rotation of the first disk.

3. The process of claim 1 wherein the second disk is stationary and the said stream is substantially solventless.

4. A process for coating the inner surface of a pneumatic tire having a radial inner open side with a viscous puncture sealing material which comprises extruding a stream of said viscous sealing material, directing the extruded stream through an opening disposed in a first disk and against a facing flat surface of a second disk, simultaneously rotating the tire and at least one of said first and second disks relative to the other while the space between spaced peripheral edges of the disks is disposed opposite said open side of the tire to pulverize said stream of viscous material and cast the resulting particulate mass through the open side of the tire and spread the particulate mass over said inner surface of the tire to form a puncture sealing coating.

5. The process of claim 4, wherein the puncture sealing material has a viscosity of at least 100,000 cps at 150° C.

6. The process of claim 4, wherein said sealing material contains a powder.

7. The process of claim 6, wherein said powder is powdered rubber.

8. The process of claim 4, wherein the said sealing material cast on the inner surface of the tire consists essentially of materials which remain on the tire surface as a component of the puncture sealing material.

* * * * *